(12) United States Patent
Schnabel

(10) Patent No.: US 11,598,404 B2
(45) Date of Patent: Mar. 7, 2023

(54) GEAR ASSEMBLY HAVING A DAMPING ELEMENT

(71) Applicant: MAGNA Powertrain GmbH & Co KG, Lannach (AT)

(72) Inventor: Thomas Schnabel, Asten (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 17/209,275

(22) Filed: Mar. 23, 2021

(65) Prior Publication Data
US 2021/0310553 A1   Oct. 7, 2021

(30) Foreign Application Priority Data

Apr. 6, 2020   (DE) .................. 10 2020 204 442.2

(51) Int. Cl.
*F16H 57/00*   (2012.01)
*F16H 63/34*   (2006.01)

(52) U.S. Cl.
CPC ..... *F16H 57/0006* (2013.01); *F16H 63/3425* (2013.01)

(58) Field of Classification Search
CPC ............ F16H 57/0006; F16H 63/3425; F16H 57/0025; F16H 55/14; F16D 63/006; F16D 3/76; F16D 3/77; F16D 3/50
See application file for complete search history.

(56) References Cited

U.S. PATENT DOCUMENTS

| | | | | |
|---|---|---|---|---|
| 3,306,583 A | * | 2/1967 | Hewitt | B66D 3/14 254/350 |
| 6,419,068 B1 | * | 7/2002 | Stephan | B60T 1/005 74/411 |
| 6,905,004 B2 | * | 6/2005 | Oppitz | F16H 63/3416 188/31 |

(Continued)

FOREIGN PATENT DOCUMENTS

| | | | |
|---|---|---|---|
| CN | 101760706 A | * | 6/2010 |
| CN | 102348825 A | | 2/2012 |

(Continued)

OTHER PUBLICATIONS

Amorphous Metals Information [online], [retrieved on Dec. 17, 2021], Retrieved from the Internet <URL:https://www.globalspec.com/learnmore/materials_chemicals_adhesives/metals_alloys/amorphous_metals> (Year: 2021).*

(Continued)

*Primary Examiner* — Richard W Ridley
*Assistant Examiner* — Aimee Tran Nguyen
(74) *Attorney, Agent, or Firm* — Dickinson Wright PLLC

(57) ABSTRACT

A gear assembly for a motor vehicle comprising at least one shaft, at least one gear component arranged on the shaft, at least one engagement component which is engaged with the gear component or can be brought into engagement with the gear component, and at least one damping element. The damping element is arranged in an operative manner between the gear component and the engagement component and/or between the gear component and the shaft, and wherein the damping element is produced at least in part from amorphous metal.

20 Claims, 3 Drawing Sheets

(56) References Cited

U.S. PATENT DOCUMENTS

| | | | |
|---|---|---|---|
| 7,926,624 B1* | 4/2011 | Taylor | F16H 39/14 |
| | | | 188/69 |
| 2003/0075391 A1 | 4/2003 | Oppitz et al. | |
| 2011/0250466 A1* | 10/2011 | Muller | B22D 19/085 |
| | | | 428/609 |
| 2020/0108865 A1* | 4/2020 | Park | F16D 3/06 |

FOREIGN PATENT DOCUMENTS

| | | | | |
|---|---|---|---|---|
| CN | 104455395 A | | 3/2015 | |
| DE | 10143386 A1 | | 4/2003 | |
| DE | 102009030005 A1 | * | 12/2010 | ......... F16H 63/3425 |
| DE | 102010038513 A1 | | 2/2012 | |
| DE | 102011114572 A1 | * | 4/2013 | ............ B60R 22/34 |
| DE | 102013204174 A1 | | 9/2014 | |
| DE | 102019209470 A1 | | 12/2020 | |
| JP | 2007321862 A | | 12/2007 | |
| WO | WO-2010108869 A1 | * | 9/2010 | ......... B22D 19/0081 |

OTHER PUBLICATIONS

Hanau, Heraeus, "A Milestone in Additive Manufacturing: The World's Largest Amorphous-Metal Component at Automate 2019," Press Release dated Apr. 8, 2019 from "Automate" in Chicago, IL, Apr. 8-11, 2019, McCormick Place, Booth 9619, 1 page.

* cited by examiner

GEAR ASSEMBLY HAVING A DAMPING ELEMENT

CROSS-REFERENCE TO RELATED APPLICATIONS

This application claims priority to German Application No. DE 10 2020 204 442.2, filed on Apr. 6, 2020 at the German Patent Office, and which is hereby incorporated by reference in its entirety.

FIELD OF THE INVENTION

The present invention relates to a gear assembly for a motor vehicle comprising at least one shaft, at least one gear component arranged on the shaft, at least one engagement component which is engaged with the gear component or can be brought into engagement with the gear component, and at least one damping element, wherein the damping element is arranged in an operative manner between the gear component and the engagement component and/or between the gear component and the shaft.

BACKGROUND OF THE INVENTION

This section provides information related to the present disclosure which is not necessarily prior art.

In the gear assemblies of motor vehicles, a wide variety of different factors in various situations lead to unwanted load peaks which create an unnecessary mechanical load on the components concerned. One example that can be mentioned of a known occurrence of load peaks of this kind is a conventional parking lock mechanism, the activation of which causes high torque peaks to occur briefly on a shaft. The resulting mechanical loads are substantially greater than the mechanical loads occurring during customary operation and necessitate a disproportionately large or stable arrangement of all components forming part of the parking lock mechanism, particularly in relation to the operating time. But even in the area of traditional gearwheels, high starting forces and load peaks can occur during operation of a motor vehicle gearbox.

SUMMARY OF THE INVENTION

This section provides a general summary of the disclosure and is not intended to be considered a comprehensive disclosure of its full scope or of all of its features.

One problem addressed by the invention with regard to the problems referred to above is that of providing an improved gear assembly which is particularly characterized by a design which reduces installation space and costs.

This need can be met by the subject matter of the present invention according to the independent first claim. Advantageous embodiments of the present invention are described in the dependent claims.

According to the invention, the gear assembly comprises at least one shaft, at least one gear component, at least one engagement component and at least one damping element.

The gear component is arranged on the shaft according to the invention.

In accordance with the present invention, the engagement component is engaged with, or can be brought into engagement with, the gear component.

The damping element is arranged in an operative manner according to the invention between the gear component and the engagement component and/or between the gear component and the shaft.

In accordance with the present invention, the damping element is produced at least in part from amorphous metal.

The damping element may be designed as a separate component, integrally with the gear component and/or integrally with the engagement component. If the damping element is designed as a separate component, it is connected to the gear component and/or the engagement component reversibly or irreversibly. A "reversible connection" in this context means a connection that can be broken largely without mechanical destruction, such as a plug connection for example. An "irreversible connection" in this context means a connection that cannot be broken, such as a bonding of the components, for example. An integral design of the damping element with the gear component and/or the engagement component should be understood in this context to mean the partial, and also complete, realization of the gear component and/or the engagement component from amorphous metal.

In a particularly preferred design variant, the gear assembly has a parking lock mechanism, wherein the parking lock mechanism comprises a parking lock gear arranged fixedly on a gear output shaft and a parking lock pawl. In this context, the gear output shaft represents the shaft of the gear assembly, the parking lock gear the gear component and the parking lock pawl the engagement component. The parking lock gear is arranged fixedly, i.e. non-rotatably and axially fixedly, on the gear output shaft. The parking lock pawl is mounted pivotably, for example on an axle fixed to a gear housing, and can be moved into a locking position during activation of the parking lock mechanism with the parking lock gear. If the parking lock pawl is moved into the locking position with the parking lock gear, the gear output shaft is locked and cannot continue to turn. The damping element is preferably arranged in an operative manner between the parking lock pawl and the parking lock gear and/or between the parking lock gear and the gear output shaft.

The damping element may be configured as a separate component, integrally with the parking lock gear and/or integrally with the parking lock pawl. Through the design of the gear assembly, in particular the arrangement and design of the damping element, it is possible for a gear assembly to be formed which is characterized by a longer service life due to the reduction in mechanical loads and load peaks occurring during running at the torque-transmitting component and the shaft. In particular, the embodiment of the gear assembly according to the invention means that an unnecessarily large arrangement of the torque-transmitting component and the shaft in relation to strength and geometric dimensions can be dispensed with. In this way, a more compact and therefore installation space-optimized arrangement can be achieved. The at least partial production of the damping element from amorphous metal means that said damping element has a high degree of strength and good resetting properties. Furthermore, flexible shaping is thereby possible—this is because amorphous metal can be processed using a kind of injection moulding process—and the damping element can easily be structurally designed during production for the desired damping property. Furthermore, the process based on injection moulding allows the amorphous metal to be applied to, or introduced into, components produced from traditional metals. Consequently, a part of the gear component or a part of the engagement component may be made of amorphous metal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
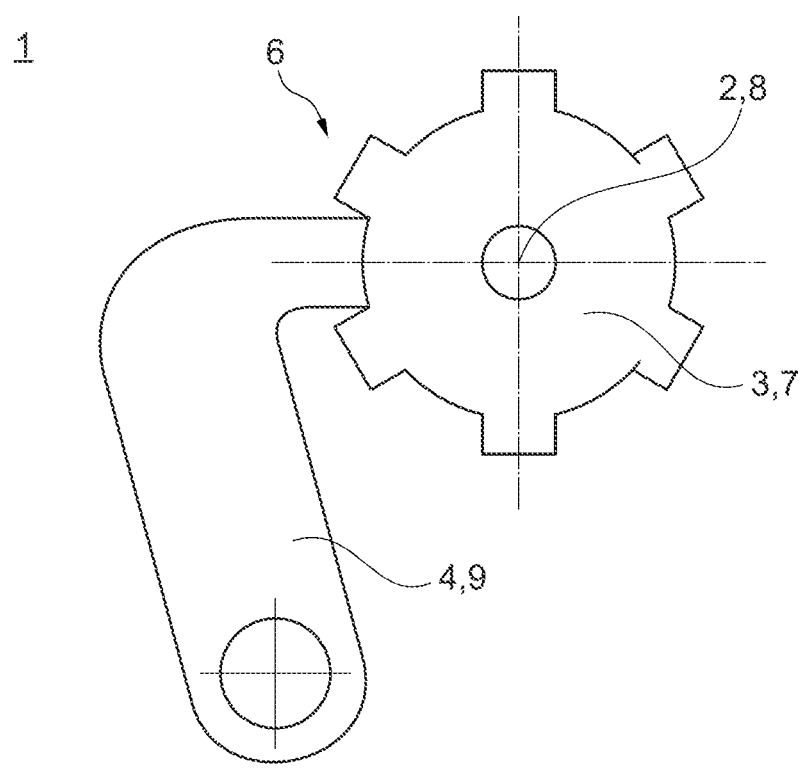
FIG. 1 shows a schematic representation of a gear assembly with a parking lock mechanism.

FIG. 1 shows schematically a parking lock mechanism 6. The parking lock mechanism 6 is part of a gear assembly 1 of a motor vehicle according to the invention.

The gear assembly 1 comprises a shaft 2, a gear component 3, an engagement component 4 and two damping elements 5, 5'.

Figure 3:
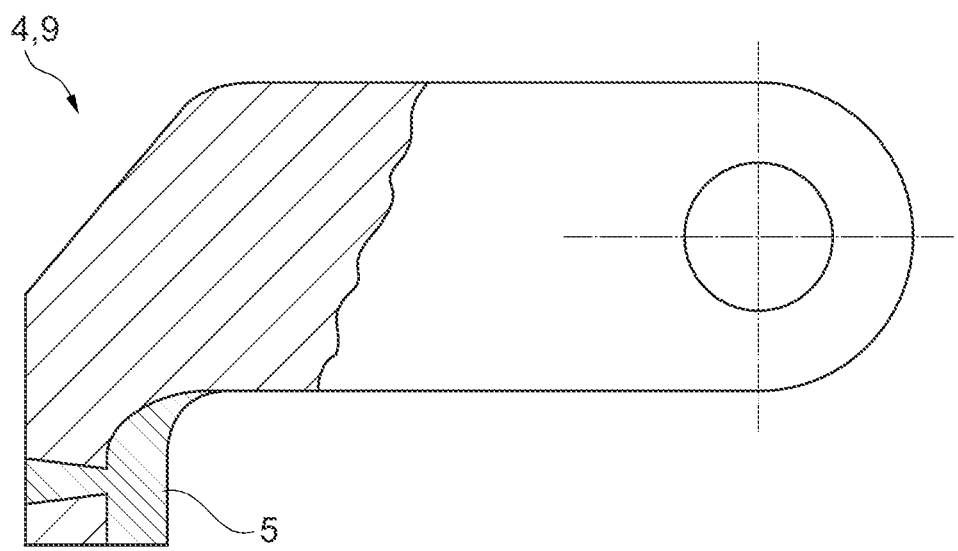
FIG. 3 shows a schematic representation of a parking lock pawl according to FIG. 1 with a damping element.

The shaft 2 shown in FIG. 1 depicts a gear output shaft 8 of the gear assembly 1. The parking lock mechanism 6 has a parking lock gear 7 fixedly arranged on the gear output shaft 8 and a parking lock pawl 9. In this context, the parking lock gear 7 represents the gear component 3 and the parking lock pawl 9 the engagement component 4. The parking lock gear 7 is arranged fixedly, i.e. non-rotatably and axially fixedly, on the gear output shaft 8. The parking lock pawl 9 is mounted pivotably on an axle fixed to a gear housing and can be brought into a locking position with the parking lock gear 7 during activation of the parking lock mechanism 6. If the parking lock pawl 9 is brought into a locking position with the parking lock gear 7, the gear output shaft 8 is locked and cannot be rotated further. One of the two damping elements 5 is arranged in an operative manner between the parking lock pawl 9 and the parking lock gear 7. For this purpose, the damping element 5 is arranged on the parking lock pawl 9 (FIG. 3).

Figure 2A:
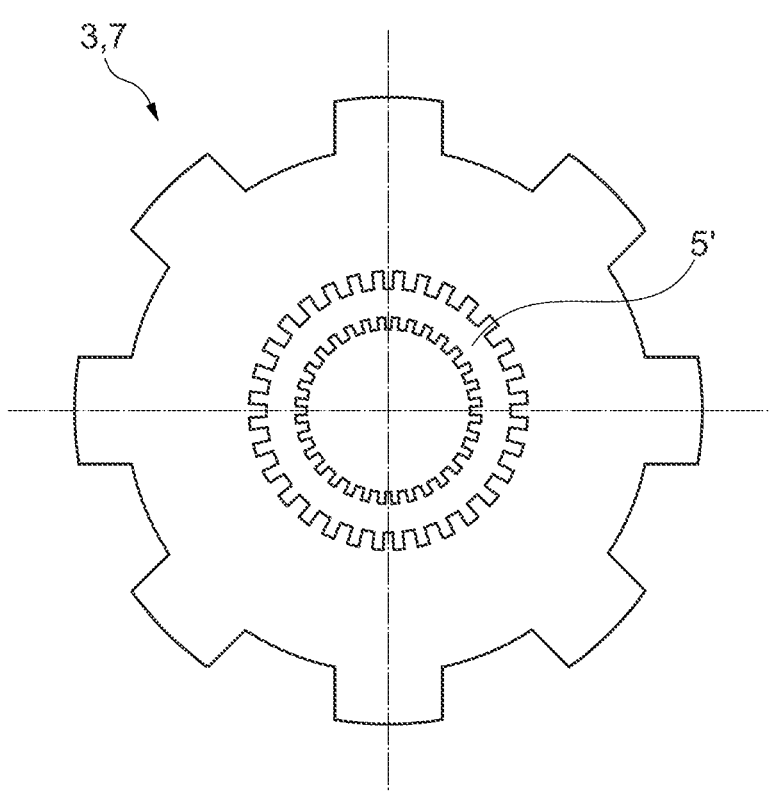
FIG. 2A shows a schematic representation of a parking lock gear according to FIG. 1 with a damping element.
Figure 2B:
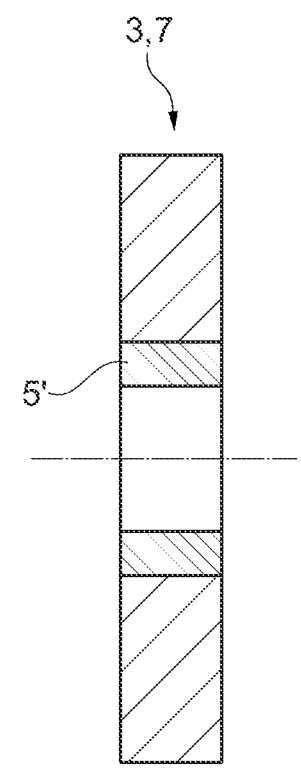
FIG. 2B shows a sectional view of a parking lock gear according to FIG. 2A along the sectional plane A-A.

The other damping element 5' is arranged in an operative manner between the parking lock gear 7 and the gear output shaft 8. For this purpose, the damping element 5' is arranged on the parking lock gear 7 (FIGS. 2A and 2B).

What is claimed is:

1. A gear assembly for a motor vehicle comprising:
   at least one shaft having an axis of rotation and defining an axial direction:
   at least one gear component, wherein the gear component is arranged on the shaft;
   at least one engagement component which is engaged with the gear component or can be brought into engagement with the gear component; and
   at least one damping element, wherein the at least one damping element is arranged in an operative manner between the gear component and the shaft,
   wherein the damping element is produced at least in part from amorphous metal, and
   wherein the at least one damping element extends continuously circumferentially around an inner diameter of the gear component;
   wherein the damping element defines an end face at an axial end of the damping element, wherein the end face is continuous along the end face and defines a closed loop along a common plane around the end face.

2. The gear assembly according to claim 1, wherein the damping element is designed as a separate component relative to the gear component and connected to the gear component either reversibly or irreversibly.

3. The gear assembly according to claim 1, wherein the gear component is fixedly arranged on the shaft, and the engagement component is pivotably arranged on a fixed axle and can be brought into a locking position with the gear component.

4. The gear assembly according to claim 3, wherein the damping element is designed as a separate component relative to the gear component and connected to the gear component either reversibly or irreversibly.

5. The gear assembly according to claim 1, wherein the at least one damping element includes a further damping element arranged in an operative manner between the gear component and the engagement component.

6. The gear assembly according to claim 5, wherein the further damping element is designed as a separate component relative to the engagement component and connected to the engagement component either reversibly or irreversibly.

7. The gear assembly according to claim 5, wherein the further damping element is joined integrally with the engagement component.

8. The gear assembly according to claim 1, wherein the damping element is joined integrally with the gear component.

9. A parking lock mechanism for a motor vehicle, the parking lock mechanism comprising:
   at least one gear output shaft defining a central rotational axis:
   at least one parking lock gear fixedly arranged on the gear output shaft;
   at least one parking lock pawl moveable from a disengaged position to an engaged position with the parking lock gear; and
   at least one damping element arranged in an operative manner between the parking lock gear and the gear output shaft,
   wherein the damping element is produced at least in part from amorphous metal, and
   wherein the damping element defines a closed circumferential loop around an outer diameter of the gear output shaft and an inner diameter of the parking lock gear;
   wherein the damping element is disposed continuously to extend both radially and circumferentially between the gear output shaft and the parking lock gear in a common plane perpendicular to a central rotational axis of the gear output shaft;
   wherein the common plane is disposed at an axial end face of the damping element;
   wherein the gear output shaft includes a plurality of outwardly extending teeth, wherein the damping element is disposed radially between the outwardly extending teeth and an inner surface of the parking lock gear at the end face of the damping element.

10. The parking lock mechanism according to claim 9, wherein the at least one damping element includes a further damping element arranged in an operative manner between the parking lock gear and the parking lock pawl.

11. The parking lock mechanism according to claim 10, wherein the damping elements are each designed as separate components relative to the parking lock gear and the parking lock pawl, wherein the damping elements are respectively connected to the parking lock gear and the parking lock pawl.

12. The parking lock mechanism according to claim 10, wherein the damping elements are each joined integrally with the parking lock gear and the parking lock pawl, respectively.

13. The parking lock mechanism according to claim 10, wherein the parking lock pawl is mounted on an axle and moved into a locking position with the parking lock gear during activation of the parking lock mechanism.

14. The parking lock mechanism according to claim 13, wherein when the parking lock pawl is in the locking position with the parking lock gear, the gear output shaft is locked and cannot turn.

15. The parking lock mechanism according to claim 10, wherein the damping members are joined integrally with the parking lock gear and the parking pawl, respectively, via injection molding, to define a respective integral parking lock gear assembly and parking pawl assembly, wherein a part of the parking lock gear assembly and a part of the parking lock pawl assembly is made of amorphous metal.

16. A gear assembly for a motor vehicle comprising:
at least one shaft defining a central rotational axis:
at least one gear component, wherein the gear component is fixedly arranged on the shaft;
at least one engagement component moveable into a locking position with the gear component; and
a first damping element arranged in an operative manner between the gear component and the shaft,
a second damping element arranged in an operative manner between the engagement component and the gear component;
wherein the first and second damping elements are produced at least in part from amorphous metal;
wherein the first damping element is ring-shaped and extends circumferentially along an interface between the gear component and the shaft;
wherein the first damping element defines a closed loop along a common plane defined by an axial end face of the first damping element.

17. The gear assembly according to claim 16, wherein the shaft is a gear output shaft, the gear component is a parking lock gear, and the engagement component is a parking lock pawl.

18. The gear assembly according to claim 17, wherein the second damping element is connected to the parking lock pawl and configured to contact an outer profile of the parking lock gear in the locking position.

19. The gear assembly according to claim 18, wherein the first damping element is connected to an inner profile of the parking lock gear and configured to contact an outer profile of the output shaft.

20. The gear assembly according to claim 16, wherein the shaft, the gear component, and the first damping component are rotatably fixed for conjoint rotation.

* * * * *